Aug. 10, 1943.  R. L. KUEHN  2,326,467
MACHINE TOOL
Filed Feb. 28, 1942  3 Sheets-Sheet 1
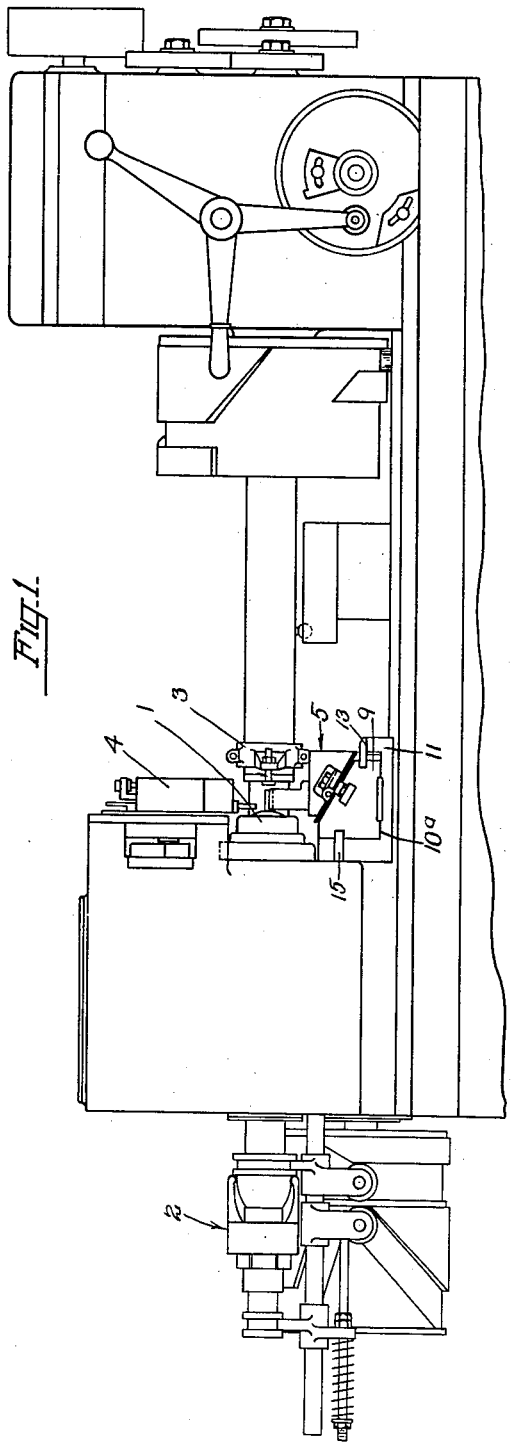
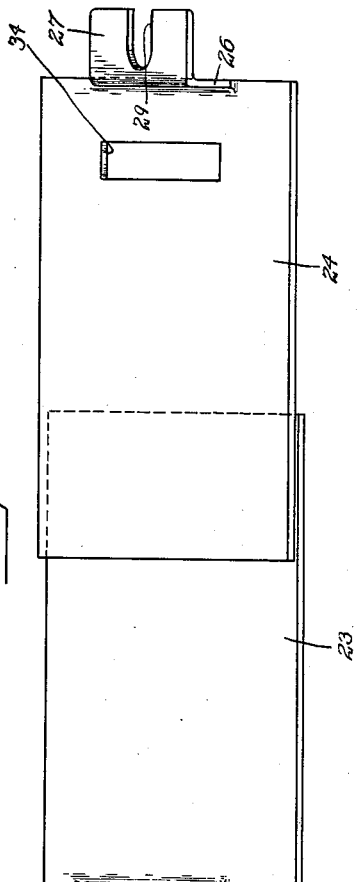
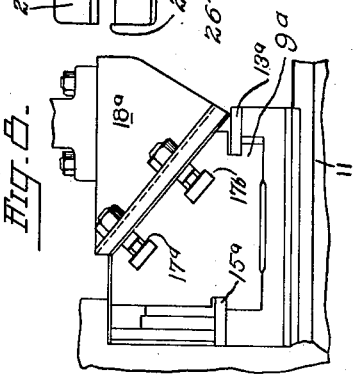
INVENTOR
Raymond L. Kuehn
By
ATTORNEY Aug. 10, 1943.  R. L. KUEHN  2,326,467
MACHINE TOOL
Filed Feb. 28, 1942  3 Sheets-Sheet 2
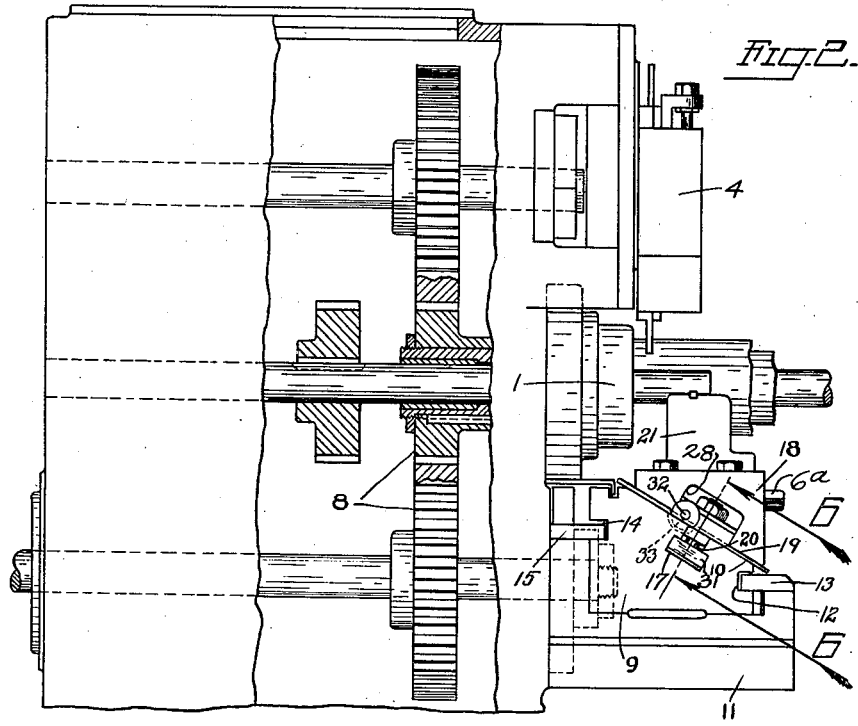
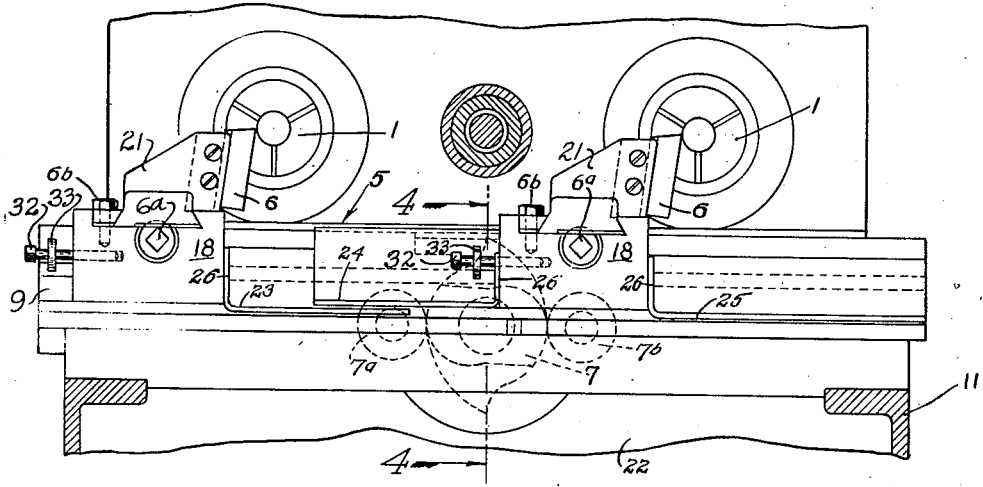
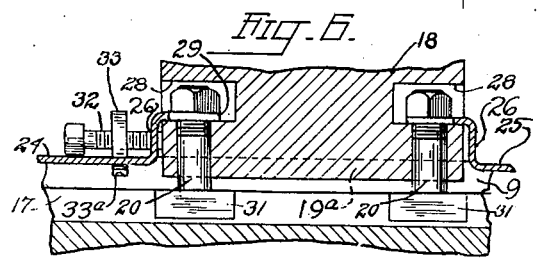
INVENTOR
Raymond L. Kuehn
By
ATTORNEY

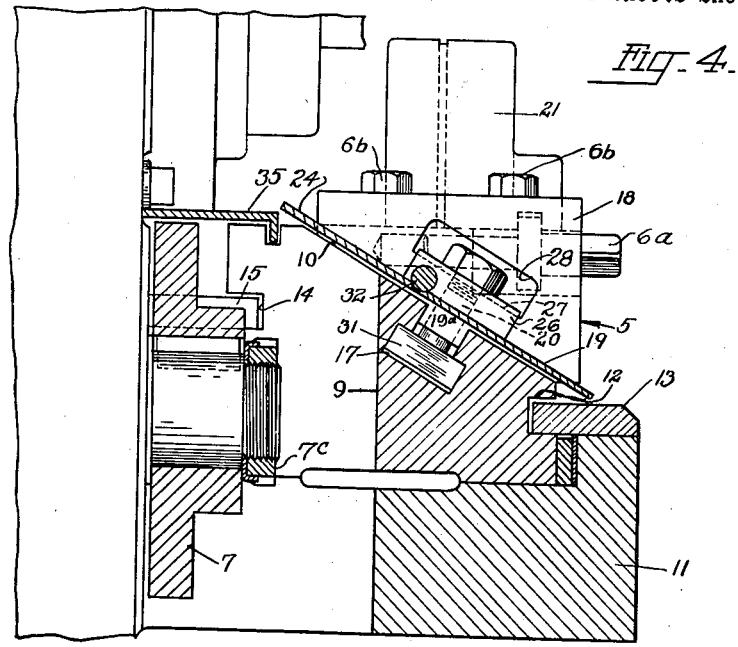
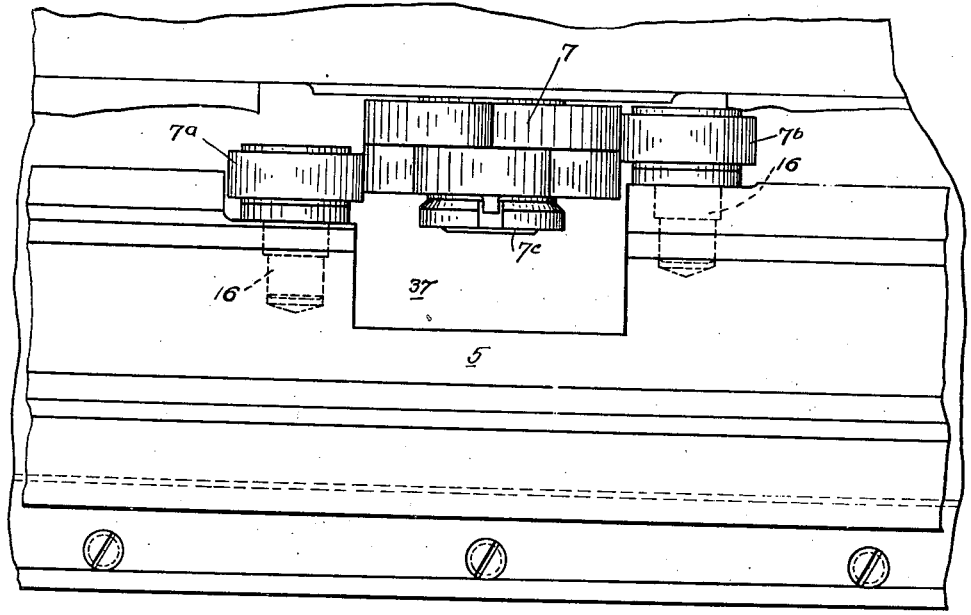

Patented Aug. 10, 1943

2,326,467

UNITED STATES PATENT OFFICE 2,326,467

MACHINE TOOL

Raymond L. Kuehn, Hartford, Conn., assignor to The Billings & Spencer Company, a corporation of Connecticut Application February 28, 1942, Serial No. 432,758

5 Claims. (Cl. 82—25)

My invention relates to machine tools.

It has among its objects to provide an improved machine tool of the so-called two-at-a-time type described and claimed in the Kelley Patent No. 2,201,182, and more particularly to provide an improved transverse tool slide structure for a tool of this type. A further object of my invention is to provide such a slide of an improved construction whereby it is made possible to support the tools thereon more rigidly than has heretofore been possible, in such manner as thereby to improve the operation of the tools. A still further object is to provide such an improved construction wherein the difficulties arising from the accumulation of cuttings are eliminated, and the same are caused to be automatically removed from the area adjacent the tools in an improved manner. Another object of my invention is to provide such an improved slide having improved cover and cuttings directing means whereby difficulty with the cuttings finding their way into the slots for the slide or tool supports is eliminated. Still another object of my invention is to provide an improved construction of transverse slide whereby it is made possible to permit ready access to the operating cam for this slide in such manner as to permit ready removal thereof when desired while the slide remains in position on the machine. These and other objects and advantages of my improvements will, however, hereinafter more fully appear.

In the accompanying drawings, I have shown for purposes of illustration certain embodiments which my invention may assume in practice.

In these drawings:

Figure 1 is a side elevation of a machine tool equipped with my improvements, the usual longitudinally fed tool structure being omitted;

Fig. 2 is an enlarged side elevation of the transverse tool slide mechanism, adjacent portions of the casing being broken away to show the driving gearing, partially in section;

Fig. 3 is a front elevation of the slide mechanism and spindles, the adjacent mechanism being broken away or omitted to facilitate illustration;

Fig. 4 is an enlarged sectional view on line 4—4 of Figure 3;

Fig. 5 is a plan view of the central portion of the slide with the tool holders removed;

Fig. 6 is a detail sectional view on line 6—6 of Figure 2;

Fig. 7 is a plan view of the middle cover members per se, the same being shown in overlapping relation, and Fig. 8 is an end elevation of a modified construction.

In these figures I have shown a machine of the general type described and claimed in the Kelley patent mentioned, modified as above, and including a plurality of parallel spindles 1 rotatable on fixed axes and having usual work feeding and gripping mechanism generally indicated at 2, usual stock stop mechanism 3 and usual cut-off mechanism 4; my present invention being directed to an improved transverse slide, generally indicated at 5, and as usual carrying a plurality of spaced forming tools 6 and operated by a usual double lobed cam 7 driven through usual driving gearing 8 and cooperating with usual cam rollers 7a and 7b on the slide 5.

Referring more particularly to the transverse slide 5, it will be noted that, as distinguished from as heretofore comprising a shallow flat slide which carries the tools 6 on high slender uprights extending vertically therefrom, I herein provide an improved slide member 9 of substantially increased weight and depth and having an angularly disposed upper surface 10 in the space beneath the work in the spindles 1 and sloping downward toward the middle of the machine. In a preferred construction, this member 9 is as wide as the machine frame 11 and has its bottom suitably supported and guided in a transverse passage 10a in the latter. As shown, the member 9 is also provided with a transverse groove 12 in its front vertical face below the front edge of the surface 10 and this groove 12 receives a gib 13 on the frame, while the deeper back vertical face of the member 9 is provided with like transverse grooves 14 receiving cooperating gibs 15 on the frame. Thus, the latter groove and gib connection 14, 15 being above the groove and gib connection 12, 13 and nearer the top of the inclined portion 10, effective guiding means are provided for the member 9 in its transverse movements relative to the frame. As shown, the cam rollers 7a, 7b are suitably journaled on supports 16 seated in the deeper back wall of the member 9 adjacent the cam 7 so that the member 9 is moved in opposite directions transversely of the frame in a usual manner relative to the guiding structure thus provided.

Attention is further directed to the fact that a usual T slot 17 is provided in the inclined top surface 10 of my new member 9 midway between the longitudinal edges of that surface. Further, tool supporting blocks 18 having inclined surfaces 19 on their bottoms corresponding to the surface 10 are seated on the latter surface and suitably guided for movement along the slide 9 by a depending rectangular portion 19a accurately fitting the entrance to the T slot 17, while the blocks 18 are rigidly connected to slide 9 by bolts 20 in any desired position of adjustment thereof longitudinally of the slots 17. Carried on the blocks 18 are also suitable tool supports 21 carrying the tool 6; these supports 21 herein being suitably attached to the blocks 18 by dovetail slides and adjustable relative thereto to adjust the tools 6 relative to the work in any well known manner through the adjusting means 6a illustrated, clamping means 6b also being provided for securing the supports 21 following adjustment. As a result of this improved transverse or cross slide construction, it will be evident that an exceedingly rigid support is provided for the tool 6, the improved member 9 and members 18 cooperating to give this increased rigidity and the members 21 carried on the blocks 18 accordingly being such as to be rigidly connectible to the blocks 18 in any of their various positions of adjustment relative thereto.

In my improved construction, it will be noted that the cuttings falling from the work will fall upon the inclined surface 10 of the slide 9 and thereby be directed downward and toward the middle of the machine so that they will pass into the open top of a suitable cuttings chamber 22 therein. Herein also improved cooperating cover plate means are provided whereby, while continuing to obtain this effect, difficulty from the cuttings entering the slots 17, 12 is also obviated, while other cooperating cover means prevent the entry of cuttings into the slot 14.

As shown, the plate means protecting the slots 17 and 12 include plates 23, 24 and 25. Of these, the plates 23 and 24 are disposed in overlapping relation shown in Figures 3 and 7 between the blocks 18. Plates 23 and 24 at their opposite ends are also provided with upwardly extending portions 26 having laterally extended slotted ears 27 thereon adapted to be received in recesses 28 in the adjacent faces of the blocks 18, while their slots 29 (Figs. 6 and 7) receive the outer ends of bolts 20 clamping the blocks 18 onto the surface 10 and having usual enlarged heads 31 received in the slot 17. Thus, as the blocks 18 are adjusted longitudinally of the member 9 and the slot 17, the cover plates 23 and 24 will be adjusted therewith. Attention here is also directed to the provision of an adjusting screw 32 threaded into block 18, and having a collar 33 fixed thereon (Fig. 6) extending through slot 34 in plate 24 and into socket 33a in slide 9, this construction being such that, upon release of the bolts 20 and rotation of screw 32 and collar 33, the block may be adjusted longitudinally due to the fact that the collar is held against longitudinal movement by its engagement in socket 33a. The plate 25 is similar to the plate 23 but longer and disposed on the opposite side of the right hand block 18 and connected thereto similarly to the connection of the plate 23 to the left hand block 18. Further, it will be noted that herein the lowermost edges of the covers 23, 24 and 25 extend downward beyond the junction of the surface 10 with the short front vertical surface of the member 9 in such manner as to prevent the cuttings entering the slot 12. As a result of this construction, it will be apparent that while the covers 23, 24 and 25 continue to provide the desired sloping surface leading toward the cuttings chamber 22, the slot 17 is covered throughout all portions of its length not already covered by the blocks 18.

Attention is also directed to the provision of a top cover plate 35 carried on the frame and extending into a slot 36 in the top of the member 9 adjacent the rear edge of the sloping surface 10 and acting to prevent cuttings reaching the rear slot 14.

In my improved construction, attention is also directed to the improved provision for permitting access to and removal of the cam 7 when desired. As shown, a vertical slot 37 is provided in the rear portion of the slide 9 between the cam rollers 7a and 7b as shown in Figure 5. This slot 37 is of such dimensions as to enable it to receive the cam 7 when the nut connection 7c thereof is removed and the cam is pulled forward on its shaft sufficiently to clear the latter. Thus, whenever for any reason it is desired to obtain access to this cam or its nut, both of the same are readily accessible through the slot 37. Further, whenever it is desired to remove the cam, this operation may be accomplished while the slide 9 remains in operative position, all necessity being eliminated for the previously necessary complete removal of the cross slide before the cam can be removed.

In the operation of this construction, it will be apparent that the slide 9 will be operated in the manner and sequence usual in machine tools of the type described. Further, it will be apparent that the tools 6 may be adjusted as desired relative to the blocks 18 and the work, while in the several positions of adjustment, the tools 6 will be much more rigidly supported than heretofore due to the improved slide member 9, the blocks 18 thereon, and the mounting of the tool supports 21 on the blocks. It will also be apparent that during the use of the tools 6, the cuttings will fall on to the sloping surfaces of the cover plates 23, 24 and 25, in such manner as thereby to be directed into the cuttings chamber 22, while the cover plates also prevent filling of the slots 17 and 12 with cuttings and the additional or back cover plate 35 prevents entry of cuttings into the slot 14. It will also be apparent that the cover plates being connected to the blocks 18, these cover plates will be adjusted longitudinally relative to the slide 9 and to one another in such manner that these cover plates will perform their desired functions in all positions of the tools. It will also be apparent that the slot 37 being between the rollers 7b, this slot will enable ready access to the cam as above described whenever desired. These and other advantages of my improved construction will, however, be apparent to those skilled in the art.

In Figure 8 I have shown a modified construction wherein instead of providing a single slot 17 on the slide 9a, a plurality of parallel slots 17a and 17b are provided therein and connected by a plurality of suitable nut and bolt connections to a block 18a which is also of slightly different conformation from that previously described. Obviously, this construction will only be required in heavier equipment, but may be used when desired. It may also be used, if desired, either with the modified gib construction shown therein at 13a, 15a, or with the form of the latter construction previously described and which is preferred.

While I have in this application specifically described two embodiments which my invention may assume in practice, it will be understood that these forms of the same are shown for purposes of illustration, and that the invention may be modified and embodied in other forms without departing from its spirit or the scope of the appended claims.

What I claim as new and desire to secure by Letters Patent is:

1. In a machine tool having a work rotating spindle, a tool carrying slide reciprocable transversely of said spindle and having an angularly disposed upper portion, guiding means for said slide on the frame of the machine including guides along the front and rear edges of said slide, and means for preventing entry of the cuttings into said guides disposed longitudinally along opposite edges of said angularly disposed portion and including deflecting means carried on and movable with said slide and projecting over said front guide, and means fixed to said frame and projecting over said rear guide.

2. In a machine tool having a plurality of parallel work rotating spindles, a tool carrying slide reciprocable transversely of said spindles beneath the latter, angularly disposed cuttings deflecting means carried by said slide and including longitudinally spaced angularly disposed portions disposed under said spindles during operation on work therein, and tool supports carried on said angularly disposed deflecting means including a tool supporting base between said portions and longitudinally adjustable on said deflecting means, a separate tool supporting base at one end of said slide and longitudinally adjustable on said deflecting means, and upstanding tool holders on said bases.

3. In a machine tool having a plurality of parallel work rotating spindles, a tool carrying slide reciprocable transversely of said spindles beneath the latter and having an angularly disposed upper face, tool supports disposed in longitudinally spaced relation along said slide and having correspondingly angled bottoms supported on said face, said angularly disposed face being longitudinally slotted and said tool supports being adjustably positioned in the slotting therein, and cover means carried on said slide and overlying the portions of the slots therein beneath said spindles during operation on the work therein.

4. In a machine tool having a plurality of parallel work rotating spindles, a tool carrying slide reciprocable transversely of said spindles beneath the latter and having an angularly disposed upper face, tool supports disposed in longitudinally spaced relation along said slide and having correspondingly angled bottoms supported on said face, said angularly disposed face being longitudinally slotted and said tool supports being adjustably positioned in the slotting therein, and cover means carried on said slide and overlying the portions of the slots therein beneath said spindles during operation on the work therein including cover members disposed in overlapping relation and fixed to said tool supports and adjustable therewith.

5. In a machine tool having a plurality of parallel work rotating spindles, a tool carrying slide reciprocable transversely of said spindles beneath the latter, slide operating means including an operating cam between the ends of said slide and cooperating operating members spaced longitudinally on said slide, means for enabling access to said cam through said slide while the latter remains in operative position, said last mentioned means comprising an aperture in said slide, and angularly disposed cuttings deflecting cover means carried by said slide and overlying said aperture.

RAYMOND L. KUEHN.